(12) United States Patent
Rheaume et al.

(10) Patent No.: US 10,654,582 B2
(45) Date of Patent: *May 19, 2020

(54) FUEL SEPARATION UNIT FOR INERT GAS GENERATING SYSTEM

(71) Applicant: Hamilton Sundstrand Corporation, Charlotte, NC (US)

(72) Inventors: Jonathan Rheaume, West Hartford, CT (US); Haralambos Cordatos, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/673,012

(22) Filed: Aug. 9, 2017

(65) Prior Publication Data

US 2019/0047721 A1    Feb. 14, 2019

(51) Int. Cl.
| | | |
|---|---|---|
| *B64D 37/32* | (2006.01) | |
| *B01D 53/22* | (2006.01) | |
| *B01D 53/00* | (2006.01) | |
| *B01D 53/86* | (2006.01) | |
| *B01D 71/02* | (2006.01) | |

(52) U.S. Cl.
CPC ........... *B64D 37/32* (2013.01); *B01D 53/002* (2013.01); *B01D 53/22* (2013.01); *B01D 53/229* (2013.01); *B01D 53/864* (2013.01); *B01D 71/02* (2013.01); *B01D 2251/102* (2013.01); *B01D 2256/10* (2013.01); *B01D 2256/12* (2013.01); *B01D 2257/504* (2013.01); *B01D 2257/702* (2013.01); *B01D 2257/80* (2013.01); *B01D 2259/4575* (2013.01)

(58) Field of Classification Search
CPC .................................................... B64D 37/32
See application file for complete search history.

(56) References Cited

U.S. PATENT DOCUMENTS

| | | | |
|---|---|---|---|
| 7,628,965 B2 | 12/2009 | Johnson et al. | |
| 7,735,670 B2 | 6/2010 | Zaki et al. | |
| 7,896,292 B2 | 3/2011 | Limaye et al. | |
| 7,905,259 B2 | 3/2011 | Johnson et al. | |
| 8,602,362 B2 | 12/2013 | Buchwald | |
| 8,669,294 B2 | 3/2014 | Lien et al. | |
| 8,828,344 B2 | 9/2014 | K-WLam et al. | |
| 9,144,768 B2 | 9/2015 | Tichborne et al. | |
| 10,272,390 B2 * | 4/2019 | Rheaume | B01D 63/04 |

OTHER PUBLICATIONS

Extended European Search Report for EP Application No. 18187990.9, dated Nov. 29, 2018, 11 pages.
J. H. Lee, et al., "Catalytic Combustion of Methane", from Fuel Processing Technology 42 (1995), pp. 339-359.
H. Hasewaga, et al., "Gas Separation Process for CO2 Removal from Natural Gas with DDR-type Zeolite Membrane", from 13th Int'l. Conference on Greenhouse Gas Control Technologies; Nov. 18, 2016, pp. 1-3.
S. Yang, et al., "DDR-Type Zeolite Membrane Synthesis, Modification and Gas Permeation Studies", from Journal of Membrane Science, vol. 105, May 1, 2016, 29 pages.

* cited by examiner

*Primary Examiner* — Stuart L Hendrickson
(74) *Attorney, Agent, or Firm* — Kinney & Lange, P.A.

(57) ABSTRACT

An inert gas generating system includes a source of a gaseous mixture, and a fuel separation unit configured to receive a portion of the gaseous mixture from the source. The fuel separation unit includes a reverse selective membrane configured to separate the gaseous mixture into a condensable gas portion and a permanent gas portion. The inert gas generating system further includes a catalytic oxidation unit configured to receive and react hydrocarbon vapors within the condensable gas portion to produce an inert gas.

14 Claims, 5 Drawing Sheets

FUEL SEPARATION UNIT FOR INERT GAS GENERATING SYSTEM

BACKGROUND

Fuel tanks can contain potentially combustible combinations of oxygen, fuel vapors, and ignition sources. In order to prevent combustion in aircraft fuel tanks, commercial aviation regulations require actively managing the risk of explosion in ullage of fuel tanks; one method is to decrease the oxygen partial pressure in the ullage to less than 12%. Relatedly, fire suppression systems, such as those deployed in aircraft cargo holds, use halogenated chemicals to prevent combustion and/or fire. Halogenated fire suppression agents can be safe for human exposure; however, they are known to be detrimental to the Earth's atmospheric ozone layer. Inert air can be used for fire prevention and suppression.

Currently, many On-Board Inert Gas Generation Systems (OBIGGS) use bleed air and pressurized hollow fiber membranes to produce inert gas for fuel tank ullages. In hollow fiber membranes, the diffusivity of nitrogen is less than the diffusivity of oxygen and water vapor. Hollow fiber membrane systems require pressurized air to drive the separation of oxygen and water vapor from nitrogen in an air stream. However, the pressure of bleed air extracted from an aircraft engine compressor varies throughout a mission, which affects inert gas production quantity and quality as defined by oxygen partial pressure. Furthermore, aircraft design is trending toward lower pressure bleed systems and increasingly electric power distribution architectures. Accordingly, the use of high pressure, hollow fiber membrane inerting systems can be problematic for these systems.

Other approaches utilize catalytic reactors to produce inert gas from ullage space fuel vapors. The ullage space, however, may not always contain a sufficient amount of fuel vapors to provide for reaction. Thus, a system capable of maintaining a safe oxygen partial pressure in the ullage is necessary in order to comply with regulations requiring ullage passivation throughout the mission.

SUMMARY

An inert gas generating system includes a source of a gaseous mixture, and a fuel separation unit configured to receive a portion of the gaseous mixture from the source. The fuel separation unit includes a reverse selective membrane configured to separate the gaseous mixture into a condensable gas portion and a permanent gas portion. The inert gas generating system further includes a catalytic oxidation unit configured to receive and react hydrocarbon vapors within the condensable gas portion to produce an inert gas.

A method for generating an inert gas includes providing a gaseous mixture to a fuel separation unit having a reverse selective membrane, and creating a partial pressure gradient such that a partial pressure of a condensable gas portion of the gaseous mixture is lower on a permeate side of the reverse selective membrane. The method further includes providing an amount of the condensable gas portion drawn through the reverse selective membrane to a catalytic oxidation unit, and reacting hydrocarbon vapors within the condensable gas portion to produce the inert gas.

An inert gas generating system includes a source of a gaseous mixture, and a fuel separation unit configured to receive a portion of the gaseous mixture from the source. The fuel separation unit condenses the gaseous mixture to produce a liquid hydrocarbon portion and a permanent gas portion. The system further includes a fuel dispersion device configured to convert the liquid hydrocarbon portion into a hydrocarbon vapor portion, and a catalytic oxidation unit configured to receive and react the hydrocarbon vapor portion to produce an inert gas.

DETAILED DESCRIPTION

A system for generating inert gases suitable for ullage passivation and cargo hold fire suppression is disclosed herein. The system includes a fuel separation unit which provides hydrocarbon fuel vapors to a catalytic oxidation unit. The fuel vapors are reacted at the catalytic oxidation unit to produce a mixture of predominantly inert gas. The system can provide the requisite amount of inert gas throughout the flight envelope.

Figure 1:
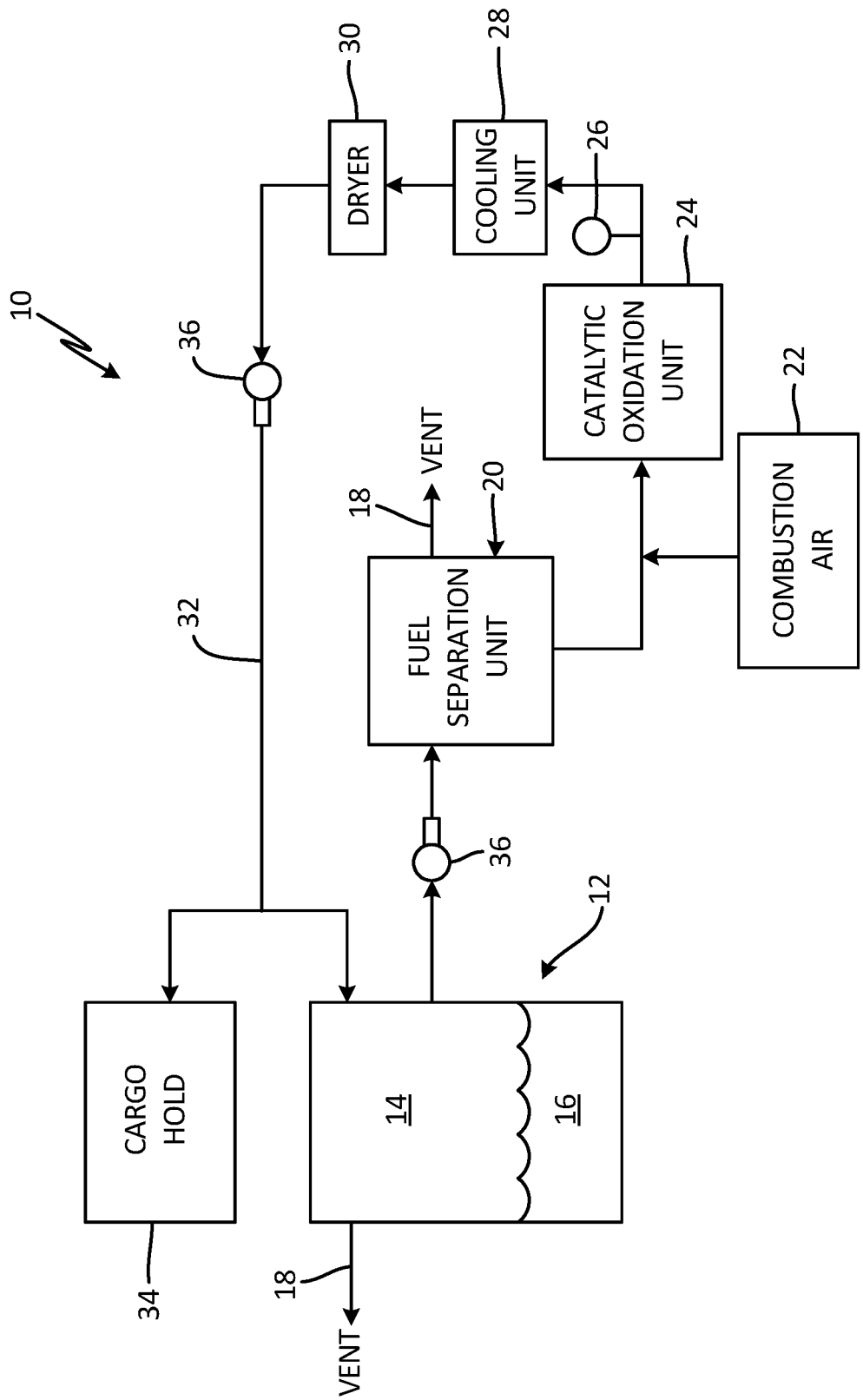
FIG. 1 is a schematic view of an inert gas generating system including a fuel separation unit.

FIG. 1 is a schematic view of inert gas generating system 10. System 10 includes fuel tank 12, which contains ullage space 14 above liquid fuel 16, and at least one vent 18. In the embodiment shown, fuel tank 12 is a center wing tank, located within the fuselage of an aircraft. However, fuel tank 12 can also be located in the wings, nose, or tail, depending on the aircraft type, or it can be a non-aviation fuel tank. Fuel tank 12 can further include partitions and/or internal pumps, as well as temperature and other sensors (not shown).

System 10 further includes fuel separation unit 20 with vent 18, combustion air source 22, catalytic oxidation unit (COU) 24, sensor 26, cooling unit 28, dryer 30, inert gas passage 32, and optionally, cargo hold 34. One or more blowers 36 can also be provided to move fluids throughout system 10. Separation unit 20 provides a portion of hydrocarbon fuel vapors to COU 24. The hydrocarbon fuel vapors are reacted within COU 24 to produce an inert gas containing primarily nitrogen, carbon dioxide, and water vapor. The catalyst used in the reaction can be, for example, a noble metal, transition metal, metal oxide, or other suitable catalyst. Cooling unit 28 and dryer 30 condition the inert gas by cooling it and removing the water vapor before its introduction to ullage space 14 and/or cargo hold 34 via passage 32. Passage 32 can include one or more actuated valves (not shown) to regulate inert gas flow into ullage space 14 and/or cargo hold 34. Other fluid passages of system 10 can also include actuated valves to regulate fluid flow throughout the system.

Liquid fuel 16 can be a kerosene-based jet fuel, such as Jet-A, Jet-A1, or Jet-B fuel. For military applications, liquid fuel 14 can also be a jet propulsion "JP" class fuel, such as JP-5 or JP-8. Other types of fuel such as diesel, gasoline, and mixtures of fuels are also contemplated herein. Ullage space 14—the vapor space above liquid fuel 16 within fuel tank 12—can contain potentially combustible fuel vapors, as oxygen within liquid fuel 16 evolves from the fuel during the flight envelope. System 10 operates to reduce the risk of combustion and explosion within ullage space 14 by providing inert gas to maintain the oxygen concentration within ullage space 14 at or below 12% oxygen by volume for commercial aviation, and below 9% for military applications.

Figure 2A:
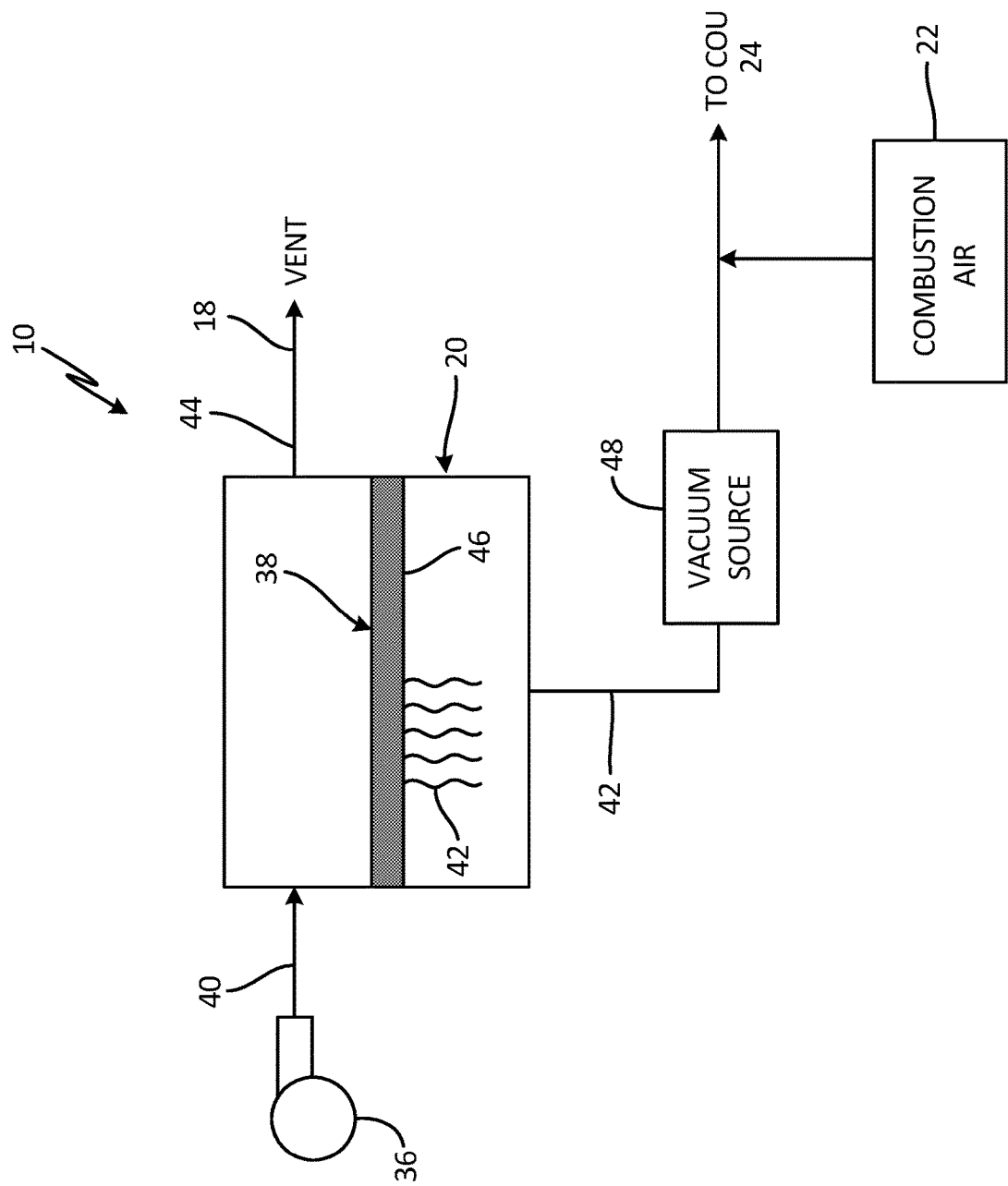
FIGS. 2A and 2B are schematic views of alternative embodiments of a fuel separation unit.

FIG. 2A is a schematic view of a portion of system 10 showing fuel separation unit 20, which is a membrane-based separation unit. Separation unit 20 includes membrane 38, which is a polymer-based, reverse selective membrane configured to selectively permeate hydrocarbon compounds over, for example, oxygen and nitrogen. Transport of species through membrane 38 depends on, among other things, the condensability of the penetrant in the polymer matrix of the membrane, their critical temperature, and interaction with the polymer. Membrane 38 can be formed from a "rubbery" polymer, or a more rigid, "glassy" polymer, depending on the application and diffusivity requirements. Rubbery polymers are those with a glass transition temperature ($T_g$) that is generally well below room temperature (77° F./25° C.), and often below 32° F. (0° C.). Glassy polymers have comparatively higher glass transition temperatures, typically well above room temperature, often exceeding 212° F. (100° C.). Membrane 38 can be formed from a cross-linked rubbery polymer, such as polydimethylsiloxane (PDMS). Other rubbery materials can include polysiloxanes and polyethers. Glassy polymers can include poly(4-methyl-2-pentyne) (PMP), poly-trimethyl-silyl-propyne (PTMSP), and polysulfones. Membrane 38 can further be arranged as a plurality of hollow fibers, or can be in planar (sheet) form and have a "spiral-wound" or "plate-and-frame" configuration. Other suitable materials and configurations are contemplated herein.

A portion of gaseous mixture 40 from ullage space 14 is provided to separation unit 20 by blower 36. Gaseous mixture 40 can contain fuel vapors and other gases, such as nitrogen ($N_2$), oxygen ($O_2$), carbon dioxide ($CO_2$), and water vapor. The composition of mixture 40 depends on the composition of liquid fuel 16, as well as other factors like altitude, temperature, and flight time. Membrane 38 selectively permeates the larger, more soluble hydrocarbon fuel vapors, along with some carbon dioxide and water vapor, over nitrogen and oxygen, to create a permeate (condensable gas portion 42) and a retentate (permanent gas portion 44). In addition to nitrogen and oxygen, permanent gas (i.e. non-condensable gas) portion 44 can also contain other gases in small quantities, such as argon and carbon dioxide. Permanent gas portion 44 can be expelled to the atmosphere through vent 18, or it can be provided along a bypass line (not shown) to passage 32 and sent to ullage space 14 and/or cargo hold 34 (all shown in FIG. 1). This can be a suitable arrangement when the composition of gaseous mixture 40 is predominantly inert gases (nitrogen and/or carbon dioxide), such as what would occur when system 10 has already been operating for a period of time to passivate ullage space 14.

To drive permeation of hydrocarbon vapors within condensable gas portion 42 across membrane 38, the partial pressure of hydrocarbon vapors should be lower on permeate side 46 of membrane 38. In the embodiment of FIG. 2A, the partial pressure gradient is generated by vacuum source 48 in communication with permeate side 46 of membrane 38. In some embodiments, vacuum source 48 can be a vacuum pump that is, preferably, an oil-free or dry variety to avoid additional maintenance and any complications arising from water vapor entrainment in the oil. In another embodiment, vacuum source 48 can be an ejector, or a plurality of ejectors. Ejector 48 can have compressed air, such as bleed air from an aircraft engine compressor stage, as a motive fluid. In yet another embodiment, vacuum source 48 can include both an ejector and a vacuum pump configured in series.

Before reaching COU 24, condensable gas portion 42 can optionally be mixed with air from combustion air source 22 to control the reaction occurring within COU 24. The reaction mechanism is discussed by U.S. patent application Ser. No. 15/629,367, "Catalytic Oxidation Product Gas Management," which is hereby incorporated by reference. Combustion air source 22 can be, for example, a source of ram air, pressurized air, or cabin outflow air. Other suitable combustion air sources are contemplated herein. Sensor 26 (shown in FIG. 1) can provide a feedback signal to a controller (not shown) to adjust the fuel-to-air ratio entering COU 24. Depending on the type of feedback system desired, sensor 26 can be configured to detect catalytic oxidation reactants or products (e.g. oxygen, carbon monoxide, carbon dioxide, or hydrocarbons), or sensor 26 can be a temperature sensor. Sensor 26 can also be a plurality of sensors 26 located throughout system 10.

Figure 2B:
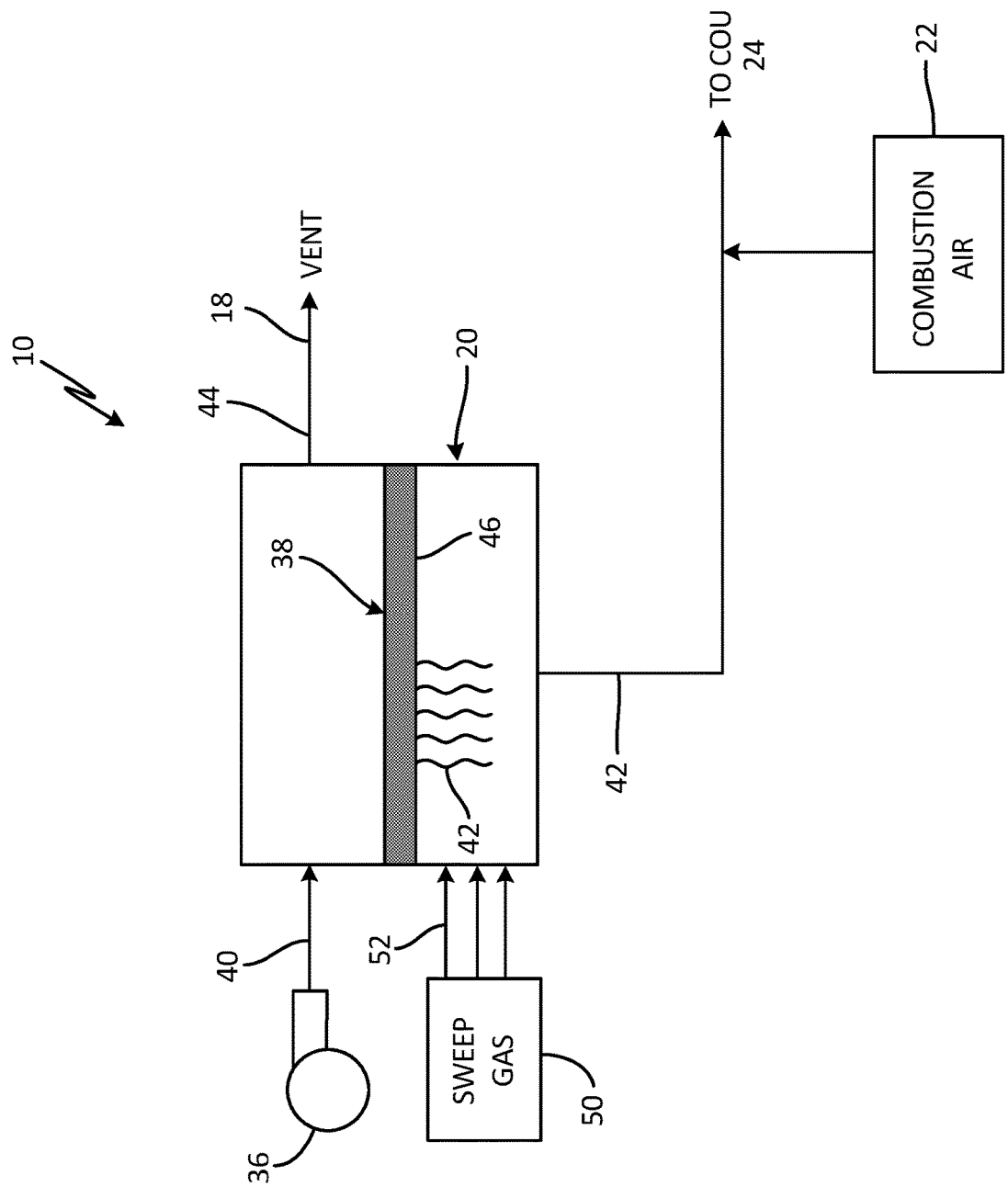

FIG. 2B is a schematic view of alternative fuel separation unit 20. In the embodiment of FIG. 2B, fuel separation unit 20 operates in almost the same manner as it does in the embodiment of FIG. 2A, except that the partial pressure gradient across membrane 38 is generated by sweep gas 52. Sweep gas 52 does not contain hydrocarbon vapors, so the initial partial pressure of hydrocarbon vapors within sweep gas 52 as it flows across permeate side 46 of membrane 38 is zero. Sweep gas 52 is preferably regulated to a temperature ranging from just above 32° F. (0° C.) to about 250° F. (121° C.). The lower limit is selected to avoid the freezing of any water vapor present within gaseous mixture 40, and the upper limit corresponds to the working temperature of membrane 38. Other factors, such as the operating range of structural components of system 10, can also influence the upper limit. Generally speaking, the warmer the sweep gas, the more hydrocarbon vapors it can transport.

Sweep gas 52 is provided by sweep gas source 50 which can be any suitable source of thermally regulated air, such as ram (outside) air, compressed air, engine bleed air, heat exchanger discharge air, conditioned air, cabin outflow air, or air heated using a heating element. Other suitable air sources are contemplated herein. In the embodiment shown, sweep gas 52 can also serve as combustion air, such that a separate stream of combustion air from combustion air source 22 is optional.

Figure 3:
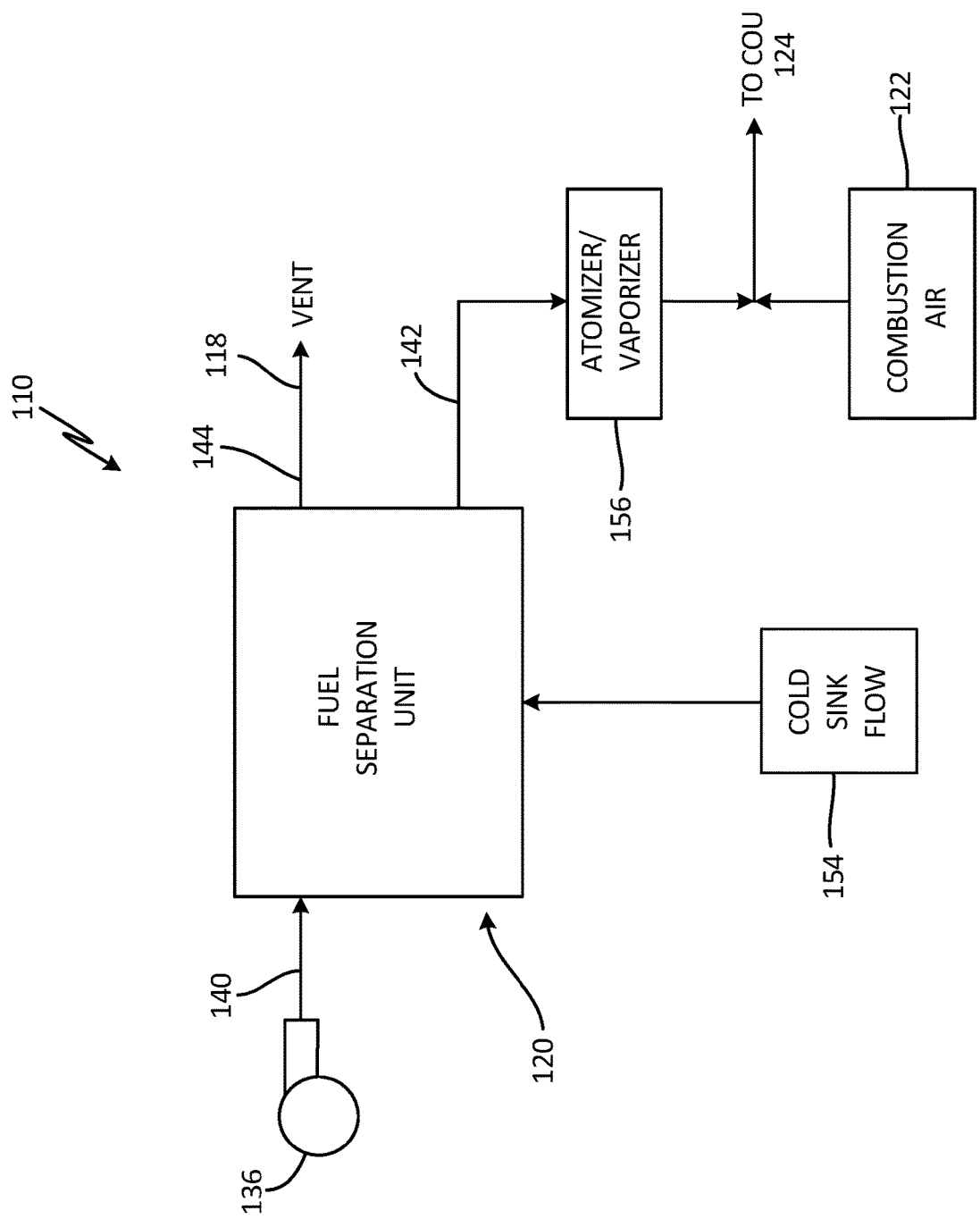
FIG. 3 is a schematic view of an alternative embodiment of a fuel separation unit.

FIG. 3 is a schematic view of alternative fuel separation unit 120. In the embodiment shown, separation unit 120 is a condenser. Gaseous mixture 140 is provided to separation unit 120 and is cooled by cold sink flow 154 which, like sweep gas 52, should be above 32° F. (0° C.) to avoid freezing water vapor within gaseous mixture 140. In some embodiments, the temperature of cold sink flow 154 can range from 41° F. (5° C.) to about 50° F. (10° C.). Cooling results in the separation of a liquid hydrocarbon portion 142 from permanent gas portion 144, containing primarily nitrogen and oxygen. Just as with the embodiments of FIGS. 2A and 2B, permanent gas portion 144 can be vented overboard, or provided to inert gas passage 36 (shown in FIG. 1). Cold sink flow 154 can be, for example, thermally-regulated ram air that is readily available during cruise, or conditioned air, such as that from the environmental control system (ECS). Other suitable cold air sources are contemplated herein. In order to provide fuel vapors to COU 124 (not shown in FIG. 3), fuel dispersion device 156, which can be an atomizer, vaporizer, or a combination of the two, is located upstream of COU 124 to treat liquid hydrocarbon portion 142.

Figure 4:
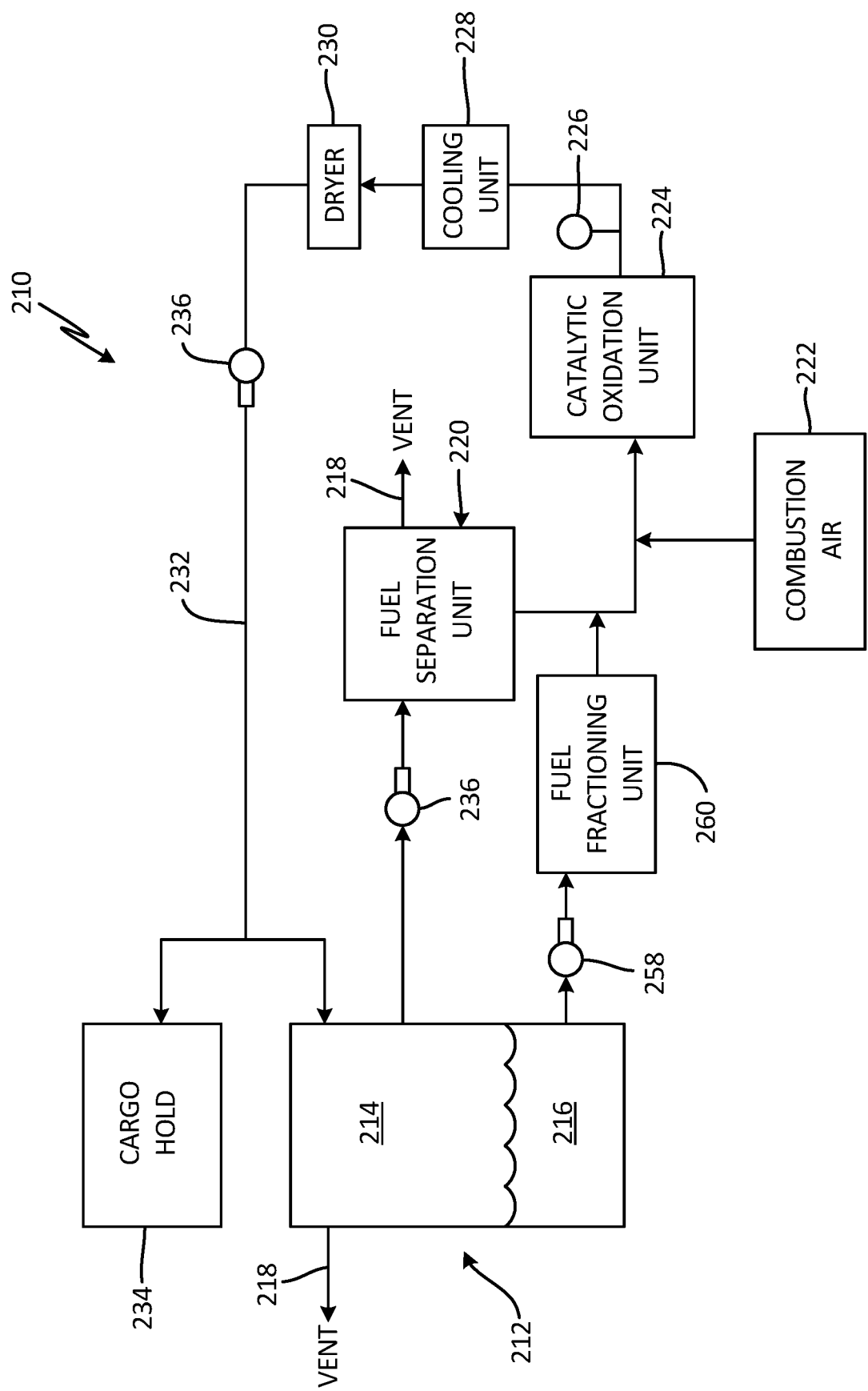
FIG. 4 is a schematic view of an alternative inert gas generating system including a fuel separation unit and a fuel fractioning unit.

FIG. 4 is a schematic showing alternative inert gas generating system 210. System 210 is similar to system 10, as shown in FIG. 1, except that system 210 is further equipped to generate hydrocarbon vapors from liquid fuel 216 using fuel fractioning unit 260. Pump 258 provides liquid fuel 216 from fuel tank 212 to fractioning unit 260, which is configured to separate out from liquid fuel 216 a portion of hydrocarbon vapors (not shown in FIG. 4). The mechanism of fractioning unit 260 is discussed in detail by U.S. patent application Ser. No. 15/468,888, "Fuel Fractioning Unit for Inert Gas Generating System," which is hereby incorporated by reference.

System 210 can be particularly useful for generating inert gas when the amount of fuel vapors within gaseous mixture 40, 140 (FIGS. 2A-3) of ullage space 214 is too dilute to produce an adequate amount of inert gas through a catalytic oxidation reaction. Such conditions can occur during cruise when the mixture of fuel vapor and oxygen is below the lean flammability limit, and also when ullage space 214 contains primarily inert gas generated by system 210. Although the risk of combustion within ullage space 214 is low under such conditions, inert gas can be demanded to facilitate fire suppression within cargo hold 234. Current fire suppression systems employ the chemical Halon 1301 in a two-stage fire suppression process. During the first, or high rate discharge (HRD) phase, an amount of Halon 1301 is quickly dumped into the cargo hold to "knock down" the fire. During the subsequent low rate discharge (LRD) phase, an amount of Halon 1301 is metered into the cargo hold to continue to suppress the fire. System 210 is capable of providing inert gas to facilitate fire suppression during the LRD phase for hybrid systems, thus reducing the amount of Halon 1301 needed for fire suppression. It is also possible to use system 210 in conjunction with a Halon-free system that, for example, uses bottled inert gas for the HRD phase and a steady supply of inert gas for the LRD phase.

Inert gas generating systems 10, 110, 210 can provide inert gas to be used for fuel sparging. That is, inert gas can be bubbled through the liquid fuel to reduce the amount of dissolved oxygen and other impurities within the fuel. Sparging has the dual benefit of stabilizing the fuel for use as a heat sink and passivating the ullage space. Systems 10, 110, 210 can also be used in non-aviation applications. For example, they can be used in maritime vessels for purging and inerting storage tanks for crude oil, natural gas, product hydrocarbons, and vehicle fuel. Systems 10, 110, 201 can also be used in the automotive or other industries having a need for inert gas.

Discussion of Possible Embodiments

The following are non-exclusive descriptions of possible embodiments of the present invention.

An inert gas generating system includes a source of a gaseous mixture, and a fuel separation unit configured to receive a portion of the gaseous mixture from the source. The fuel separation unit includes a reverse selective membrane configured to separate the gaseous mixture into a condensable gas portion and a permanent gas portion. The inert gas generating system further includes a catalytic oxidation unit configured to receive and react hydrocarbon vapors within the condensable gas portion to produce an inert gas.

The system of the preceding paragraph can optionally include, additionally and/or alternatively, any one or more of the following features, configurations and/or additional components:

The system further includes a pressure differential generator in fluid communication with a permeate side of the reverse selective membrane, wherein the pressure differential generator is configured to create a partial pressure gradient across the reverse selective membrane.

In one embodiment, the pressure differential generator is a source of a sweep gas.

The sweep gas is selected from the group consisting of ram air, compressed air, engine bleed air, air passed through a heat exchanger, conditioned air, cabin outflow air, air passed over a heating element, and combinations thereof.

In one embodiment, the pressure differential generator is a vacuum source.

The vacuum source is one of a pump and an ejector.

The reverse selective membrane includes a silicone-based material.

The system further includes an inert gas passageway configured to provide the inert gas to a defined space.

In one embodiment, the defined space is a fuel tank.

In one embodiment, the defined space is a cargo hold.

The system further includes a source of a liquid hydrocarbon fuel, and a fractioning unit configured to receive a portion of the liquid hydrocarbon fuel from the source and to separate from the portion of the liquid hydrocarbon fuel a hydrocarbon vapor portion. The fractioning unit is configured to provide the hydrocarbon vapor portion to the catalytic oxidation unit.

The source of the gaseous mixture and the liquid hydrocarbon fuel is a fuel tank.

A method for generating an inert gas includes providing a gaseous mixture to a fuel separation unit having a reverse selective membrane, and creating a partial pressure gradient such that a partial pressure of a condensable gas portion of the gaseous mixture is lower on a permeate side of the reverse selective membrane. The method further includes providing an amount of the condensable gas portion drawn through the reverse selective membrane to a catalytic oxidation unit, and reacting hydrocarbon vapors within the condensable gas portion to produce the inert gas.

The method of the preceding paragraph can optionally include, additionally and/or alternatively, any one or more of the following features, configurations and/or additional components:

In one embodiment, generating the partial pressure gradient includes flowing a sweep gas over the permeate side of the reverse selective membrane.

In one embodiment, generating the partial pressure gradient includes operating a vacuum source in fluid communication with the permeate side of the reverse selective membrane.

The method further includes mixing the amount of the condensable gas portion with an amount of combustion air from a combustion air source prior to the reacting step.

An inert gas generating system includes a source of a gaseous mixture, and a fuel separation unit configured to receive a portion of the gaseous mixture from the source. The fuel separation unit condenses the gaseous mixture to produce a liquid hydrocarbon portion and a permanent gas portion. The system further includes a fuel dispersion device configured to convert the liquid hydrocarbon portion into a hydrocarbon vapor portion, and a catalytic oxidation unit configured to receive and react the hydrocarbon vapor portion to produce an inert gas.

The system of the preceding paragraph can optionally include, additionally and/or alternatively, any one or more of the following features, configurations and/or additional components:

The system further includes a source of a cold sink flow in communication with the fuel separation unit.

The cold sink flow is thermally regulated to a temperature ranging from about 32° F. to about 50° F.

The cold sink flow is one of a ram air flow and a conditioned air flow.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inert gas generating system comprising:
   a source of a gaseous mixture;
   a fuel separation unit configured to receive a portion of the gaseous mixture from the source, the fuel separation unit comprising a silicone-based membrane configured to separate the gaseous mixture into a condensable gas portion and a non-condensable gas portion;
   a pressure differential generator in fluid communication with a permeate side of the silicone-based membrane, wherein the pressure differential generator is configured to create a partial pressure gradient across the silicone-based membrane; and
   a catalytic oxidation unit configured to receive the condensable gas portion and to produce an inert gas.

2. The system of claim 1, wherein the pressure differential generator is a source of a sweep gas.

3. The system of claim 2, wherein the sweep gas is selected from the group consisting of ram air, compressed air, engine bleed air, air passed through a heat exchanger, conditioned air, cabin outflow air, air passed over a heating element, and combinations thereof.

4. The system of claim 1, wherein the pressure differential generator is a vacuum source.

5. The system of claim 4, wherein the vacuum source is one of a pump and an ejector.

6. The system of claim 1 and further comprising: a fluid passageway configured to provide the inert gas to a defined space.

7. The system of claim 6, wherein the defined space is a fuel tank.

8. The system of claim 6, wherein the defined space is an aircraft compartment.

9. The system of claim 1 and further comprising:
   a source of a liquid hydrocarbon fuel; and
   a fractioning unit configured to receive a portion of the liquid hydrocarbon fuel from the source and to separate from the portion of the liquid hydrocarbon fuel a hydrocarbon vapor portion;
   wherein the fractioning unit is configured to provide the hydrocarbon vapor portion to the catalytic oxidation unit.

10. The system of claim 9, wherein the source of the gaseous mixture and the liquid hydrocarbon fuel is a fuel tank.

11. A method for generating an inert gas, the method comprising:
    providing a gaseous mixture to a fuel separation unit, the fuel separation unit comprising a silicone-based membrane configured to separate the gaseous mixture into a condensable gas portion and a non-condensable gas portion;
    creating a partial pressure gradient using a pressure differential generator in fluid communication with a permeate side of the silicone-based membrane such that a partial pressure of the condensable gas portion of the gaseous mixture is lower on the permeate side of the silicone-based membrane;
    providing an amount of the condensable gas portion drawn through the silicone-based membrane to a catalytic oxidation unit; and
    reacting hydrocarbon vapors within the condensable gas portion to produce the inert gas.

12. The method of claim 11, wherein generating the partial pressure gradient comprises flowing a sweep gas over the permeate side of the silicone-based membrane.

13. The method of claim 11, wherein generating the partial pressure gradient comprises operating a vacuum source in fluid communication with the permeate side of the silicone-based membrane.

14. The method of claim 11 and further comprising: mixing the amount of the condensable gas portion with an amount of combustion air from a combustion air source prior to the reacting step.

* * * * *